Feb. 17, 1970    E. L. SLOVER    3,495,303
FEED PROPORTIONING CONTROL SYSTEM FOR COTTON GINS
Filed Dec. 15, 1966    6 Sheets-Sheet 1
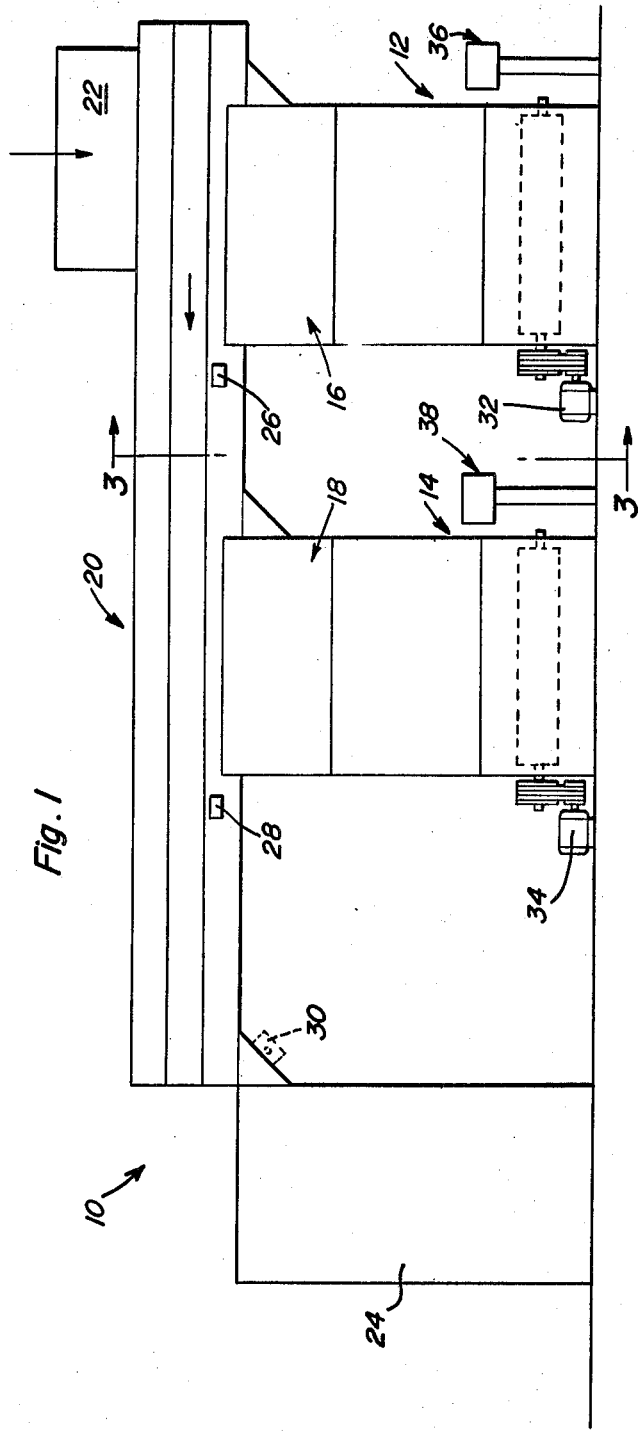
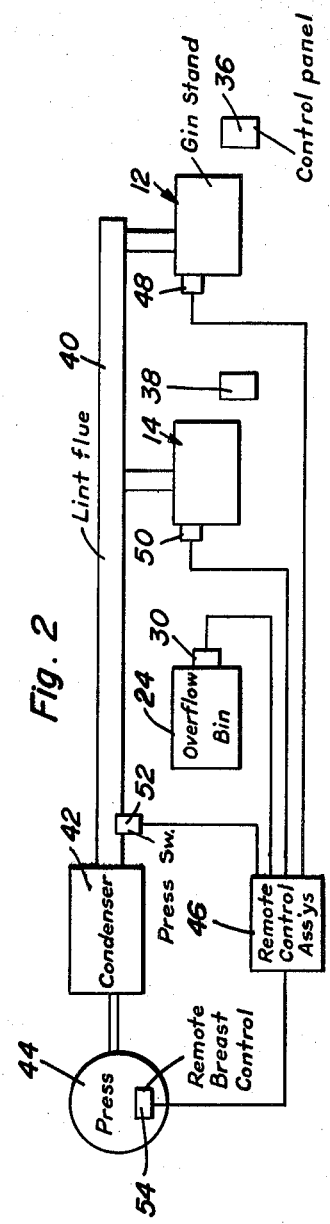
Eugene L. Slover
INVENTOR.

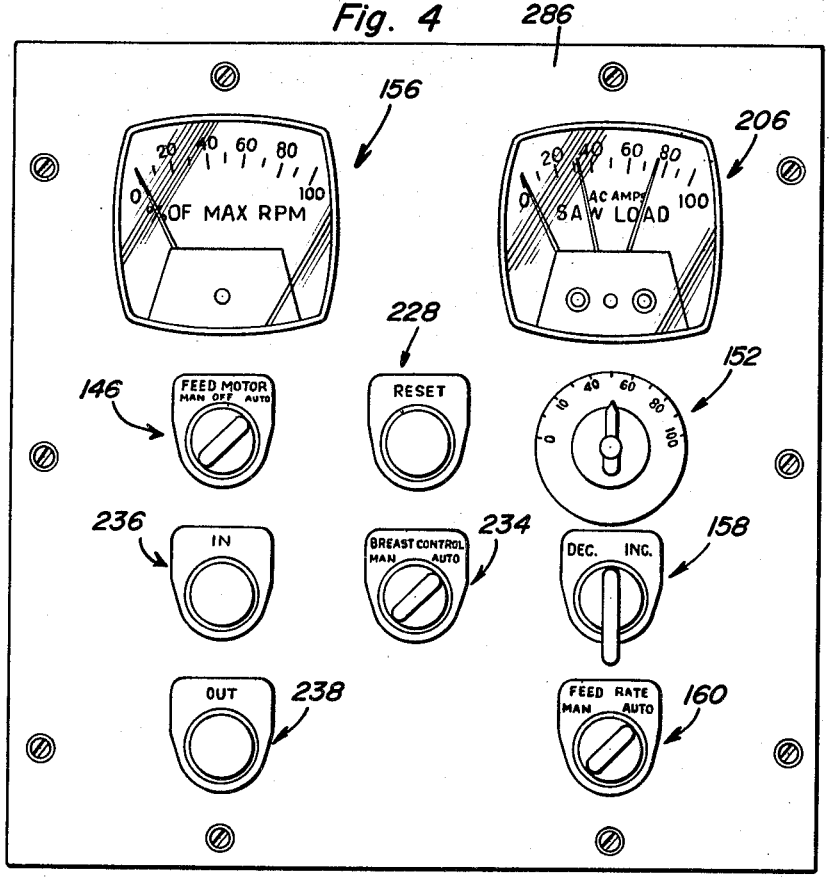
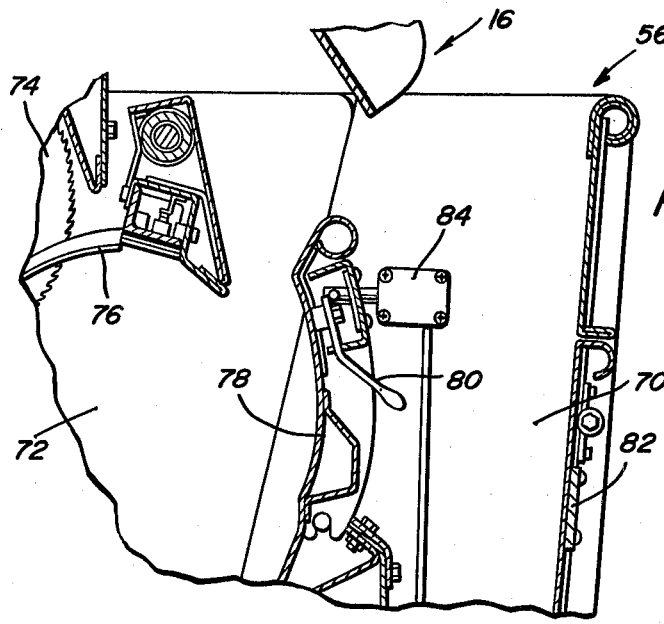

Eugene L. Slover
INVENTOR.

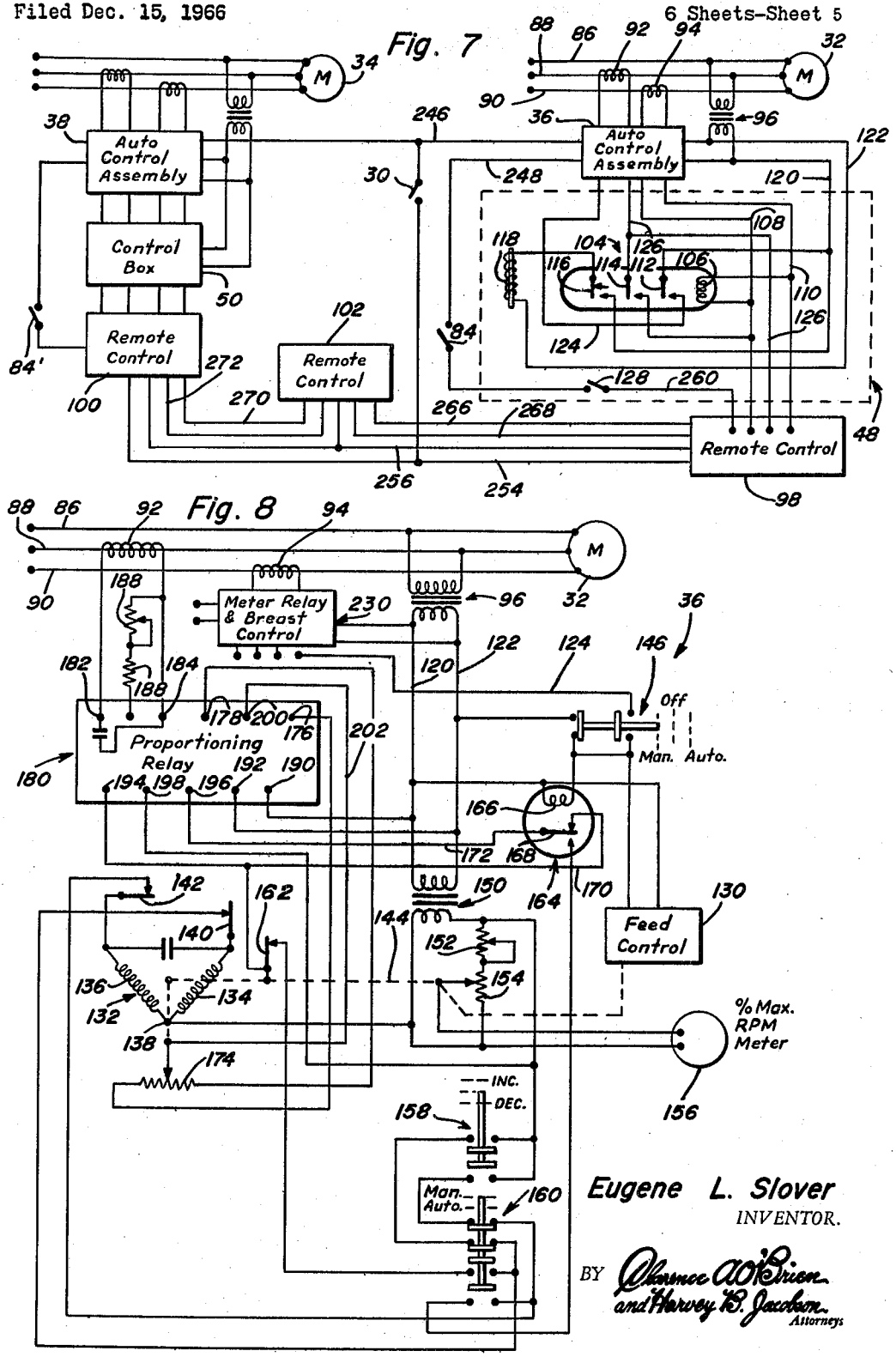

Feb. 17, 1970   E. L. SLOVER   3,495,303
FEED PROPORTIONING CONTROL SYSTEM FOR COTTON GINS
Filed Dec. 15, 1966   6 Sheets-Sheet 6
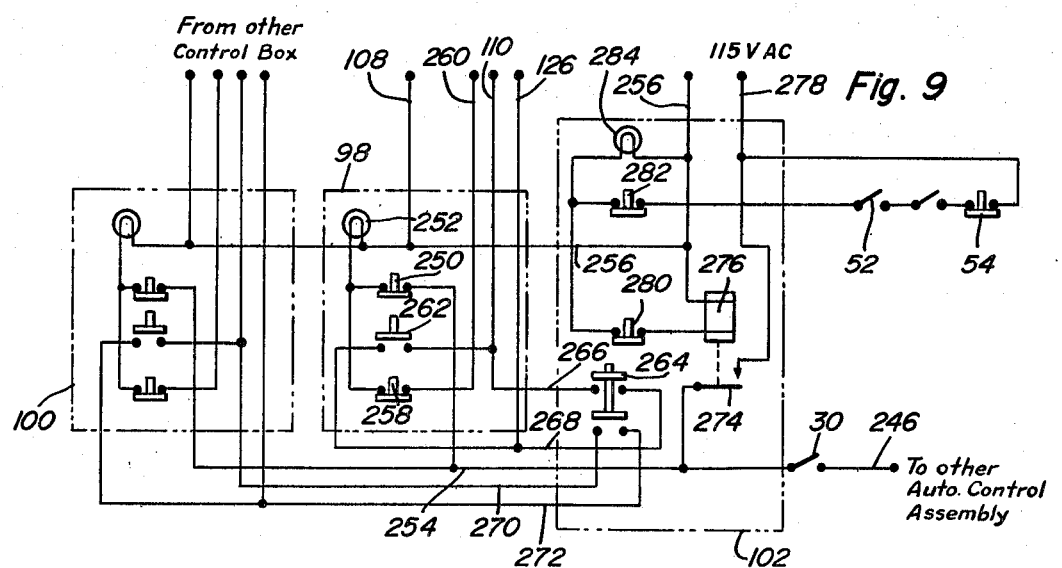
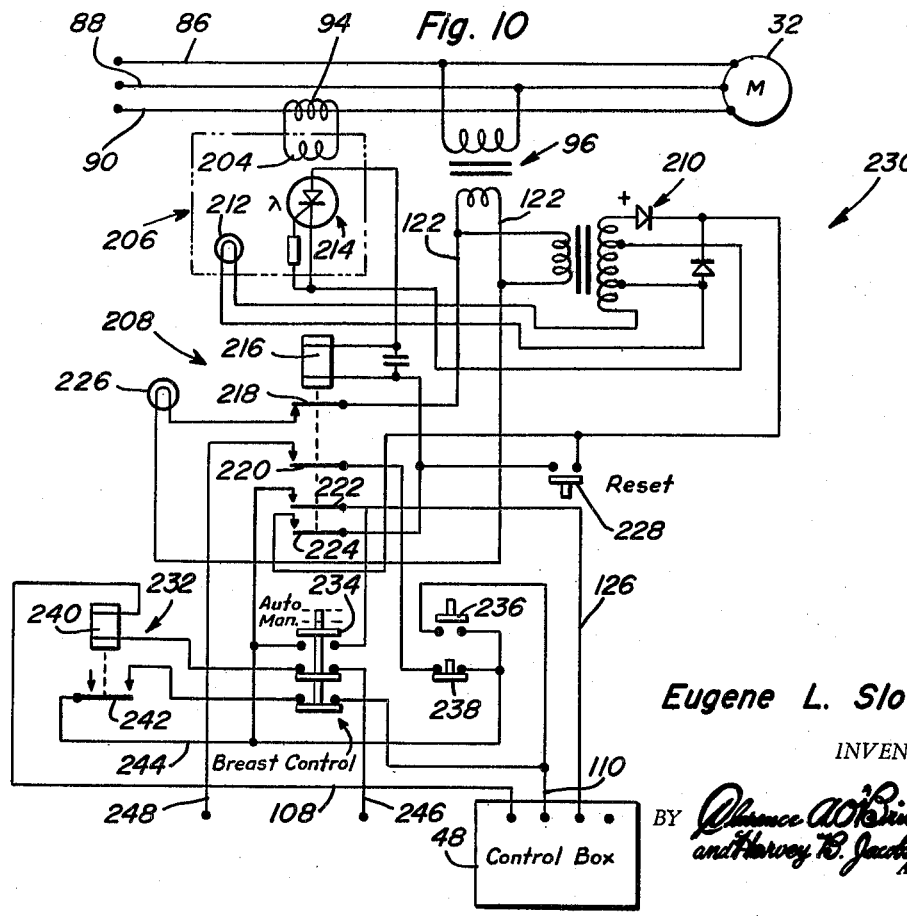
Eugene L. Slover
INVENTOR.

United States Patent Office 3,495,303
Patented Feb. 17, 1970

3,495,303
FEED PROPORTIONING CONTROL SYSTEM FOR COTTON GINS
Eugene L. Slover, Sherman, Tex., assignor to Hardwicke-Etter Company, a corporation of Texas
Filed Dec. 15, 1966, Ser. No. 601,976
Int. Cl. D01b 1/08
U.S. Cl. 19—64.5                16 Claims

ABSTRACT OF THE DISCLOSURE

An electrical control system for regulating the feed rate of raw cotton and controlling the operation of one or more cotton gins to which the raw cotton is fed in accordance with the ability of the cotton gins to gin cotton. The ginning rate of the cotton gins which varies in accordance with the quality of the raw cotton, is reflected by the output of signal coils inductively coupled to the power lines supplying current to the motors that drive the ginning saws. The feed rate is thereby varied and operation of the feeders and gins automatically controlled to prevent underloading and overloading.

BACKGROUND OF THE INVENTION

This invention relates to textile fiber separation and more particularly to the detachment of cotton by mechanical means from the seeds with which it is produced in nature. Such mechanical means or cotton gins involve a bank of circular saws slightly spaced apart and rotated with each saw blade projecting through a narrow slit in a ribbed breast plate or rib bank in order to engage the seed fiber. The fiber clings to the teeth of the saw blades as the teeth pass back through the slits between the ribs, the slits being so narrow that the seeds cannot follow. By measuring the current drawn by the motor that drives the saw blades, it is possible to determine the ginning rate or the quantity of cotton pulled through the ginning ribs and separated from the seed. The length of the staple, the coarseness of the fiber, its strength and the size of the seed in the cotton as well as the moisture content of both will determine the degree to which the seed is attached to the fiber and the rate at which the raw cotton sould be fed to the gin so that the cotton may be ginned at a maximum ginning rate. Thus, the quality of the raw cotton will determine the load imposed on the gin motor driving the ginning saws producing a corresponding current flow to the gin motor, the measurement of which is utilized to vary the feed rate of cotton supplied to the gin.

Current responsive controls have been utilized to vary the feed rate of raw cotton to cotton gins. Pressure responsive controls have also been utilized to sense any buildup of lint pressure in the lint flue through which ginned cotton is withdrawn from the gin in order to detect any clogging and automatically stop ginning operation. To temporarily stop ginning operation, the breast or bank of ribs between which the ginning saw blades project, are pivotally displaced away from the saw blades to an inactive position usually utilizing a fluid operated breast positioning device for such purpose. Despite the aforementioned prior art controls, a considerable amount of supervision must be exercised over the operation of cotton gins in order to make adjustments and start or stop operation to avoid damage to the machinery because of malfunctions to which the controls do not respond. Further, prior art control arrangements have not had the capability of exercising quality control over the bales of cotton pressed from the lint cotton as withdrawn from the gin.

SUMMARY OF THE INVENTION

In accordance with the present invention, an integrated electrical control system is provided for one or more cotton gins to which raw cotton is fed from a common distributor conveyor and from which ginned cotton or lint is withdrawn through a common lint flue. The control system is extremely flexible in use so as to not only accommodate automatic load, flow and pressure responsive controls but to also provide for manual control over any one or all of the cotton gins otherwise subject to automatic control.

In connection with the automatic controls aforementioned, not only is the feed rate to the individual cotton gins varied in accordance with the load imposed on the ginning saws, but the ginning operation is interrupted should overload occur or in the event of an inadequate supply of raw cotton.

Temporary interruption in the ginning operation by displacement of the ginning breast to an inactive position is also effected in accordance with the present invention whenever the roll box front of the gin stand is opened exposing the seed roll chamber into which the raw cotton is fed by the feeder associated with the gin. Thus, a protective measure is provided against injury to maintenance personnel.

Another important attribute of the control system in accordance with the present invention, is the provision of time delay relays through which ginning operation continues for a predetermined delay period after feeding operation has stopped in order to remove all remaining cotton from the feeder to reduce the load on the ginning saws below a low set point. Further, operation of the gin is interrupted or delayed whenever the supply of raw cotton is inadequate so that the quality of the batch of cotton being ginned is preserved. In this regard, it should be appreciated that if insufficient cotton is entering the gin stand, there will be an increase in the percentage of short fiber, pieces of sticks and leaf trash that go to the press from the gin stand particularly when the bale of cotton is being finished. Since the value of the bale of cotton is determined by samples taken from each side of the bale, it is exceedingly important that ginning be delayed until an adequate supply of the requisite quality cotton is being fed through the feeder and that ginning be automatically interrupted before the quality of the cotton begins to decrease. The control system of the present invention is capable of exercising the aforementioned quality control functions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIGURE 1 is a simplified view showing a multi-gin installation through which cotton is ginned.

FIGURE 2 diagrammatically illustrates in top plan view the arrangement of components associated with the installation of the present invention.

FIGURE 4 is a front elevational view of the control panel as viewed from a plane indicated by section line 4—4 in FIGURE 3.

FIGURE 5 is an enlarged partial sectional view showing a portion of one of the gin stands associated with the installation of the present invention.

FIGURE 7 is an electrical circuit diagram of the control system associated with the present invention.

FIGURE 8 is an electrical circuit diagram showing the automatic control assembly components of FIGURE 7 in detail.

FIGURE 9 is an electrical circuit diagram showing the remote control components of FIGURE 7 in detail.

FIGURE 10 is an electrical circuit diagram showing the meter relay and breast control component of FIGURE 8 in detail.

DESCRIPTION OF THE PREFERRED EMBODIMENTS

General arrangement

Figure 3:
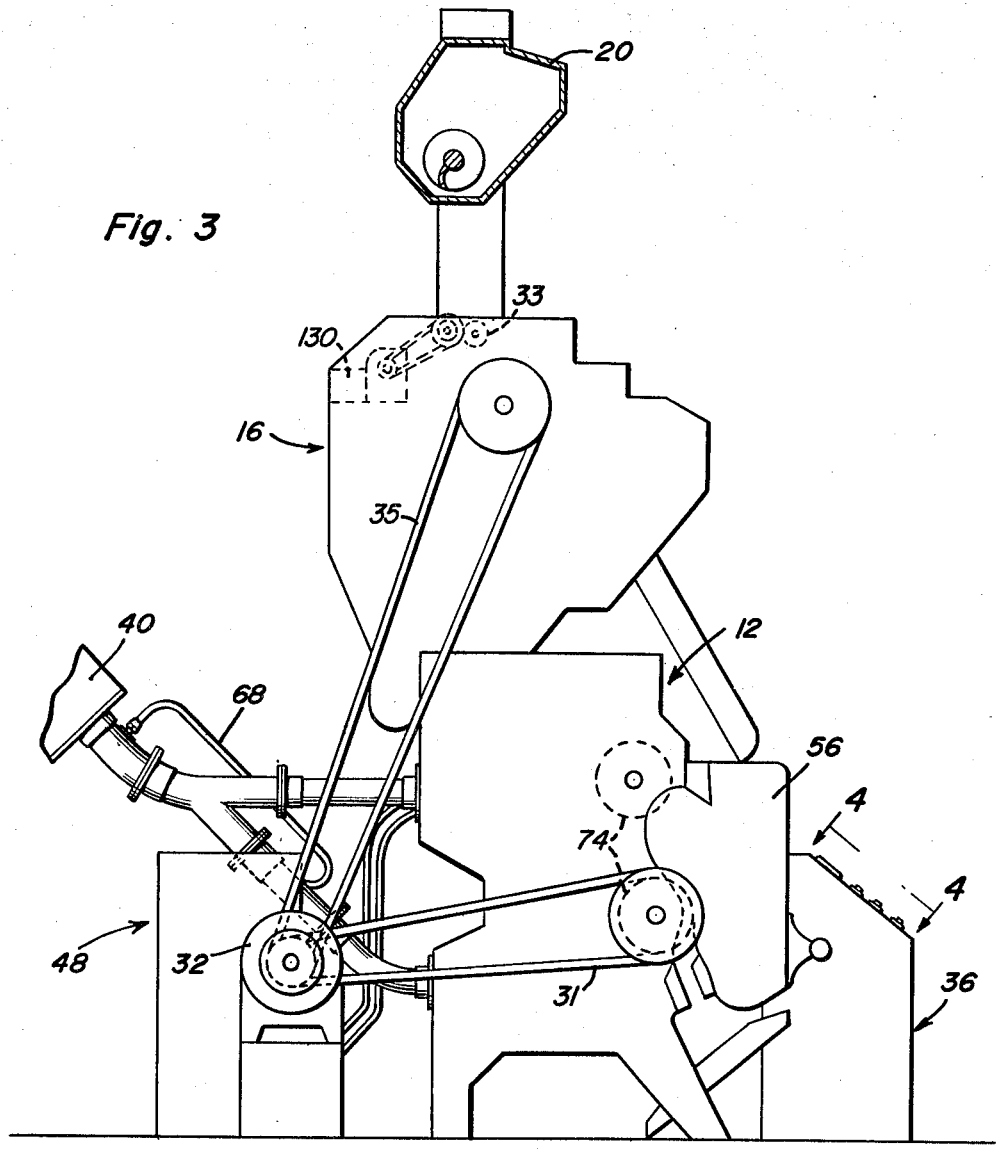
FIGURE 3 is a partial transverse sectional view taken substantially through a plane indicated by section line 3—3 in FIGURE 1.

Referring now to the drawings in detail, FIGURE 1 illustrates a typical multi-gin installation generally denoted by reference numeral 10 with which the present invention is concerned. It should be appreciated however that the invention is also applicable to a single gin stand installation. In the illustrated embodiment, two gin stands 12 and 14 are mounted on the supporting floor in spaced relation to each other. Raw cotton is fed to each gin stand at a regulated rate by means of associated feeders 16 and 18 to which raw cotton is supplied by means of an elevated, horizontally elongated distributor conveyor 20. Thus, raw cotton is introduced into the distributor conveyor adjacent one end by means of a supply hopper 22, the cotton being conveyed toward the other end at which an overflow bin 24 is located. As the cotton travels along the distributor conveyor, it is fed into the feeders 16 and 18 associated with the gin stands. A sufficient quantity of cotton is continuously conveyed along the distributor conveyor so that an adequate supply will be available at each of the feeders 16 and 18 for feeding into the gin stands at feeding rates regulated by the feeders 16 and 18. The presence or absence of an adequate supply of cotton in the distributor conveyor at each of the feeders is detected by microswitches 26 and 28 located adjacent each of the feeders. Alternatively, a microswitch 30 as shown by dotted line in FIGURE 1, may be mounted at the overflow bin 24 so as to detect the presence of an adequate supply of cotton in the distributor conveyor by virtue of flow thereof into the overflow bin.

The cotton fed into the gin stands at feed rates regulated by the feeders 16 and 18, is ginned at ginning rates determined by the quality of the cotton as aforementioned. The gin stands are independently operated by gin motors 32 and 34. The load imposed on the gin motors and the feed rates of the associated feeders are monitored and regulated through control assemblies 36 and 38 located adjacent each of the gin stands 12 and 14 as shown in FIGURE 1. Thus, operation of the gin stands and associated feeders may be automatically regulated while supplying ginned cotton to a common lint flue 40 as diagrammatically shown in FIGURE 2. The lint flue conducts the ginned cotton to a condenser 42 from which the cotton is supplied to a press 44 within which it is baled. Control over the gin stands and associated feeders is also exercised through remote control assemblies generally referred to by reference numeral 46 operatively connected to the overflow sensing switch 30, for example, associated with the overflow bin and to control boxes 48 and 50 respectively associated with the gin stands. A pressure responsive switch 52 is also mounted on the lint flue 40 adjacent the condenser so as to interrupt operation of the gin stands through the remote control assemblies should excessive pressure develop. Finally, operation of the gin stands may be interrupted by personnel at the press 44 through a remote control device 54 operating through the remote control assemblies 46 should any malfunction be detected at the press.

Figure 6:
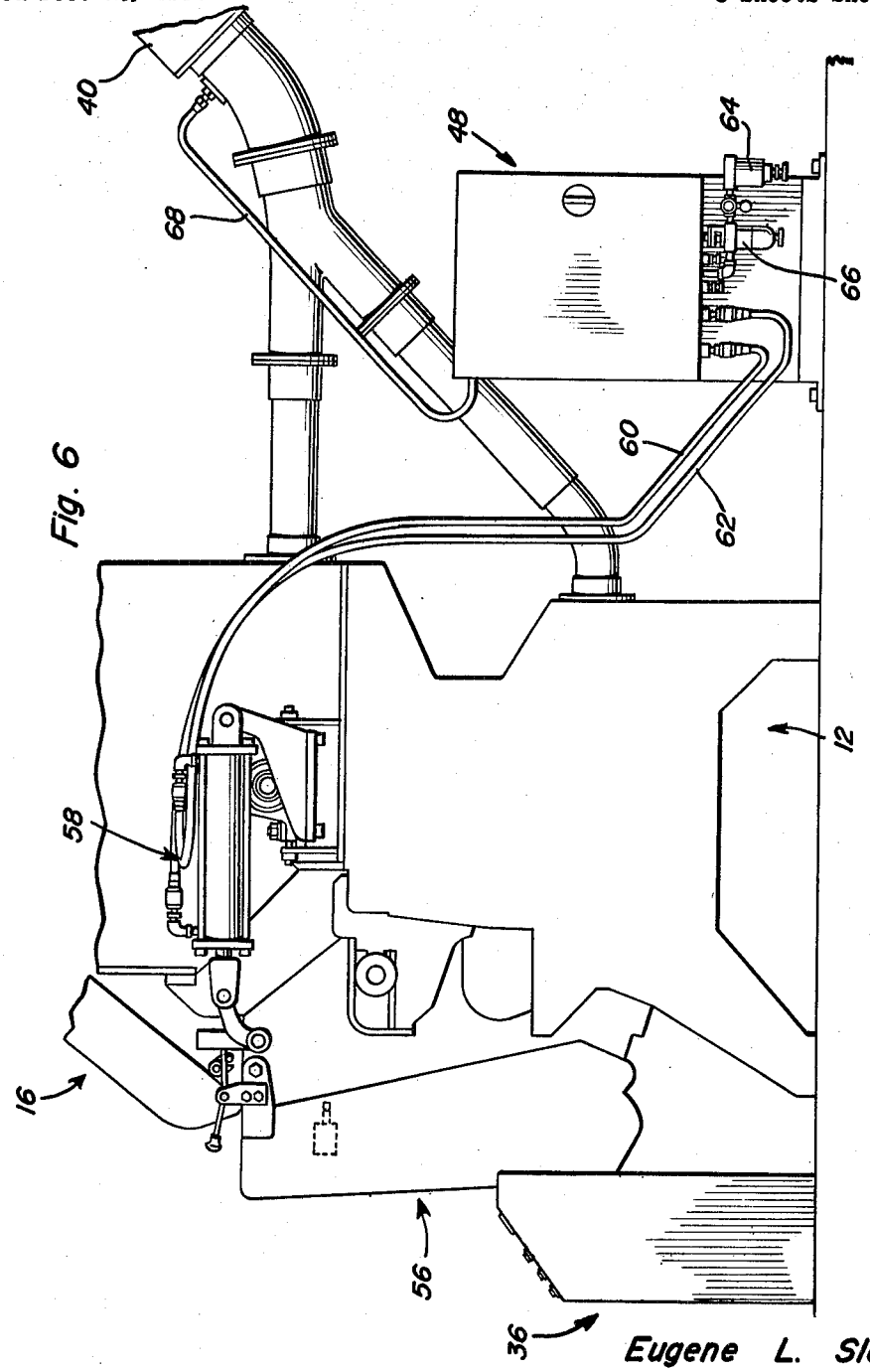
FIGURE 6 is an enlarged side elevational view of one of the cotton gins as viewed from the side opposite to that shown in FIGURE 3.

Referring now to FIGURE 3, one of the gin stands 12 and associated feeder 16 are shown. The gin stand and feeder in itself is of any well known commercial type, the construction and operation of which forms no part of the present invention. In this type of apparatus, the gin motor 32 is drivingly connected by belt drive 31 to the ginning saws 74 (shown by dotted line in FIGURE 3) which project into a seed roll chamber between the ginning ribs in a breast portion associated with the gin stand 12, while all the moving elements of the feeder 16 except for the feed rollers 33 (shown by dotted line in FIGURE 3) are driven in synchronized relation to the ginning saws through belt drive 35. The breast portion 56 is pivotally displaceable from an active position as illustrated in FIGURE 6 to an inactive position by means of a fluid operated cylinder device 58. Fluid under pressure is supplied to opposite ends of the cylinder device through the fluid conduits 60 and 62 connecting the cylinder device to the control box 48. The conduits 60 and 62 are therefore connected to a source of fluid under pressure through a solenoid operated control valve within the control box, the fluid under pressure being supplied to the control valve through a pressure regulator 64 and filter 66 for example. Thus, the control box contains the controls through which ginning operation is interrupted in response to control signals of both automatic and manual origin. The control box also includes a pressure responsive switch connected to the lint flue through the conduit 68 in order to sense any excessive buildup of pressure resulting for example from clogging.

As shown in FIGURE 5, the breast portion 56 of the gin stand in its active ginning position, encloses a seed roll chamber 72 into which the ginning saw blades project including the saw blade 74, between the ginning ribs 76 of the breastplate for separating cotton fiber from the seeds delivered to the chute 70 in a manner well known to those skilled in the art. In the type of gin stand illustrated, the chute 70 is separated from the seed roll chamber 72 by the outer scroll sheet or closure 78 which may be pivotally opened to expose the chamber 72 by means of the locking handle 80 mounted thereon when the outer door 82 is opened. In accordance with the present invention, a safety microswitch device 84 is mounted in any suitable manner on the side of the roll box for example so that upon unlocking of the handle 80 to open the seed roll chamber 72 by the locking handle 80, the microswitch 84 will be actuated in order to dispatch a circuit opening control signal to the control box 48 for operating the cylinder device 58 as hereinafter explained. The breast portion 56 of the gin stand is thereby pivotally displaced to its inactive position withdrawing the ginning ribs 76 form operative relation to the ginning saw blades. The microswitch device 84 therefore protects maintenance personnel by interrupting ginning operation while the seed roll chamber 72 is being serviced.

Control system

Referring now to FIGURE 7, it will be observed that each of the gin motors 32 and 34 is separately connected to a source of electrical energy through the power supply lines 86, 88 and 90. The load imposed upon each of the gin motors by the ginning saws is monitored through a pair of current signal transformer coils 92 and 94 inductively coupled to the power lines 88 and 90 and connected to the automatic control assembly associated with each gin stand. Also, electrical energy for operating each of the automatic control assemblies and control boxes associated with the gin stands is derived through a transformer 96 connected across the power lines 86 and 88. The feed rate of the raw cotton through the feeder into the gin stand and operation of the feeder and the gin stand is automatically controlled through the automatic control assembly by starting or interrupting the ginning operaton involving the displacement of the breast portion of the gin stand between the active and inactive positions thereof. The breast portion associated with each gin stand may also be selectively displaced between its active and inactive positions under manual control by means of remote control components 98 and 100 respectively wired to the control boxes 48 and 50. The remote control components 98 and 100 are also interconnected with each other and with a remote control component 102 through which the breast portions associated with both gin stands may be simultaneously displaced to the inactive or active position should this be desired. It will also be noted from FIGURE 7, that the overflow microswicth 30 is interconnected between the remote control components and both of the automatic control assemblies 36 and 38 so as to automatically interrupt operation of both gin stands should there be an inadequate supply of raw cotton in the distributor conveyor. Separate safety microswitch devices 84 and 84' on the other hand are interconnected between the automatic control assemblies and control boxes associated with the gin stands in order to interrupt the ginning operation of only that gin stand being serviced by opening of the seed roll chamber as aforementioned.

Breast positioning control

With continued reference to FIGURE 7, it will be observed that each of the cotnrol boxes includes a time delay relay device 104 having a relay operating coil 106 connected to both the automatic control assembly 36 and the remote control component 98 associated therewith by the conductors 108 and 110. Accordingly, the time delay relay device 104 is alternatively energized under control of the automatic control assembly 36 or under manual control through the remote control components 98 and 102. When the coil 106 is energized, all of the normally opened relay switches 112, 114 and 116 are immediately closed. Upon deenergization of coil 106, relay switches 112 and 114 open immediately while relay switch 116 remains closed for a delay period. Closing of the time delay relay switch 116 connects the valve controlling solenoid coil 118 across the secondary winding of transformer 96 through conductors 120 and 122 in order to effect displacement of the breast portion of the gin stand to its active position through the fluid operated cylinder device 58 aforementioned. It will be apparent therefore that upon deenergization of the relay device 104, the ginning operation will continue for a delay period until the relay switch 116 opens. Also, upon energization of the relay device 104, the disabling switch 112 connects the power line 120 to the automatic control assembly through conductor 124 in order to automatically render the feeder operative. Closing of the relay siwtch 114 on the other hand interconnects the conductors 108 and 126 in order to establish a relay holding circuit for the relay device capable of being interrupted either under control of the automatic control assembly or through the remote control component. The energizing circuits for the relay coil 106 in all cases is established through the safety micro-switch 84 in series with a lint pressure responsive switch 128 interrupting operation whenever excessive pressure develops in the lint flue. Accordingly, automatic or manual control can be exercised over operation of the gin stand only when the gin stand is in proper operating condition.

Feed control

Referring now to FIGURE 8, it will become apparent that the current sensing coil 92 controls the feed rate of raw cotton through the feed rollers 33 of the feeder. The feeder may be driven by any suitable feed control motor 130, of the variable speed type whether it be an electric motor as hereinafter described or a hydraulic motor having an adjustably positioned feed rate control device the details of which form no part of the present invention. When using a variable speed, D.C. motor for example, as the feed control, its speed may be varied by changing the resistance of its armature circuit through an angularly movable control element corresponding to a desired feed rate setting. The feed rate setting of the feed motor 130 is automatically changed as depicted in FIGURE 8 by a reversible control motor 132 of a commercial type such as the "Modutrol" Motor, Model M904F, manufactured by Minneapolis-Honeywell Regulator Company, and disclosed in Instruction Sheet 95–1483, published by Honeywell, Inc. This type of control motor includes forward and reverse motor coils 134 and 136 connected between a common terminal 138 and forward and reverse limit switches 140 and 142. Energization of one or the other of the motor coils is therefore operative to reposition the rotor 144 of the motor 132 in order to change the feed rate setting of the feed motor 130 energized from the supply lines 120 and 122 through a feed motor control switch 146. In the manual position shown in FIGURE 8, the feed motor 130 is directly connected across the supply lines 120 and 122 by switch 146. When displaced to the off position, operation of the feeder will be interrupted by disconnecting the motor 130 from its source of energy. On the other hand when the feed motor control switch 146 is in the automatic position, the feed motor is connected to the supply line 122 through the conductor 124 to the remote control component 98 in order to render the feeder operative only when the breast portion 56 of the gin stand is in or is being displaced to the active ginning position.

A step-down transformer 150 inductively couples the output of transformer 96 to the terminals of the motor coils associated with control motor 132 for changing the feed rate through the feeder. Connected across the secondary of transformer 150, is a variable load consisting of a manually adjustable, set point potentiometer 152 in series with a motor driven speed signal potentiometer 154. It will be apparent therefore that the position of the rotor 144 associated with the control motor 132 will be reflected by the volt drop across the speed signal potentiometer 154. Accordingly, the voltmeter 156 is connected across the potentiometer 154 between its wiper arm and one terminal of the secondary of transformer 150 in order to indicate the percentage of maximum speed at which cotton is being fed through the feeder. To energize the control motor 132 in either direction for changing the feed rate, the common terminal 138 is connected to one terminal of the secondary of transformer 150 while the other terminal thereof is connected to either of the limit switches 140 and 142 through a feed rate changing switch 158 when the mode selector switch 160 is in the manual position illustrated in FIGURE 8. Therefore, when the feed rate changing switch 158 is in the off position illustrated, the feed rate will remain constant. The switch 158 is displaced in one direction or the other in order to increase or decrease the feed rate by momentarily energizing the control motor 132 in one or the other direction. The control motor will of course be deenergized when the rotor reaches the extreme limit positions thereof opening one or the other of the limit switches 140 and 142. Changing the position of the rotor also produces a corresponding change in the volt drop across the speed signal potentiometer 154 indicated by the meter 156.

In order to change the feed rate of the feeder automatically, the mode selector 160 is displaced to the automatic position disconnecting the limit switches 140 and 142 from the transformer 150 so that displacement of the feed rate changing switch 158 to either of its operative positions will have no effect. The limit switches 140 and 142 are then connected through the mode selector 160 to a travel limit switch 162 and to the normally opened contact associated with an over speed relay device 164. The travel limit switch 162 is opened by the control motor when it reaches a predetermined position in order to prevent the feed rate from decreasing below a minimum value such as 40% of the maximum speed of the feed motor. This will insure that an adequate supply of cotton is immediately delivered to the gin stand to load the ginning saws when the ginning operation begins. The over speed relay device 164 on the other hand prevents the feed motor speed from over speeding during intervals when there is substantially no load on the ginning saws. The relay 164 includes therefore a relay coil 166 connected across the lines 120 and 122 through the feed motor control switch 146. A sudden increase in voltage across the secondary of transformer 96 resulting from unloading of the power lines 86 and 88 will therefore energize the relay coil 166 connecting conductor 172 to the mode selector 160 in order to complete an energizing circuit for the control motor through limit switch 142 advancing the rotor 144 to a position of maximum feed rate corresponding to a minimum load across the secondary of transformer 150. From this minimum load or low set point position, the load or resistance of potentiometer 154 may be automatically increased by energizing the control motor through limit switch 140 in accordance with changes in the load on the gin motor. Thus, when the load on the gin motor decreases as reflected by a decrease in the current conducted through power line 88, a corresponding decrease in the feed rate or increase in the resistance of potentiometer 154 is produced by momentary energization of the motor coil 134 associated with the control motor changing the position of the wiper arm in a speed control potentiometer 174.

The speed control potentiometer 174 is connected across the terminals 176 and 178 of a proportioning relay device 180 terough which momentary energization of the control member 132 is controlled. Proportioning relay devices of this type are commercially available, the details and operation of which form no part of the present invention. Such proportioning relay devices are for example manufactured by Honeywell, Inc. as shown in Instruction Sheet 95–5921 published by this company in connection with a proportioning relay Model R7165A. Thus, the current coil 92 inductively coupled to the power line 88 is connected to the input terminals 182 and 184 in parallel with the series connected resistor 186 and the sensitivity adjusting potentiometer 188 to provide a current responsive signal. The proportioning relay device is energized from the lines 120 and 122 through the terminals 190 and 192 in order to provide an output at output terminal 194 proportional to the current being monitored by the coil 92 when terminals 196 and 194 are interconnected by the relay 164. The output terminal 194 is connected to the motor coil 134 through the travel limit switch 162, mode selector 160 and limit switch 140 as aforementioned to momentarily energize the motor in the proper direction. When relay 164 is energized, switch 168 connects terminal 196 to motor coil 136 through the mode selector 160 and limit switch 142 to energize the motor in the other direction. The terminal 200 is connected through a feedback line 202 to the wiper arm of the speed control potentiometer 174 so as to stop rotation of the control motor at the position to which it is rotated by the input signal. Since the load consisting of the speed signal potentiometer 154 and the set point potentiometer 152 is connected to the proportioning relay through terminal 198, a reference load setting and feed rate to which the feed motor may be automatically increased by the control motor 132 will depend upon the setting of the potentiometer 152. This reference load setting may therefore be adjusted through the low set point potentiometer 152 during automatic operation in order to obtain what is determined to be optimum control conditions for each gin stand.

Overload control

Referring now to FIGURE 10, it will be observed that the current monitoring coil 94 inductively coupled to the power supply line 90 for the gin motor, monitors the load imposed on the gin motor in order to register this load through the metering coil 204 associated with a saw load indicating meter 206. Power for operating the meter 206 as well as an associated relay circuit 208 is derived from the transformer 96. Such meter and relay combinations are manufactured by the General Electric Company as Type 195 Meter Relays disclosed in an instruction sheet published by this company covering such a device. A transformer and rectifier power supply 210 in this meter relay combination, furnishes A.C. current to an energizing circuit for lamp 212 establishing an energizing circuit for relay coil 216 through a light activated switch device 214. When the meter 206 indicates an overload condition, the light beam from lamp 212 is interrupted thereby deenergizing relay coil 216 in order to close the normally closed relay switch 218 and open the normally opened relay switches 220, 222 and 224. Thus, upon deenergization of the relay coil 216, the relay switch 218 completes an alerting circuit energizing the indicator lamp 226 to signify the overload condition. Normally however, the relay coil 216 is energized to hold the alerting circuit for the indicator lamp 226 open. After the relay coil 216 is deenergized, it must be reset by momentary closing of the reset switch 228 operative to connect the relay coil 216 across the rectified output of the power supply 210 in series with the light activated switch device 214. Once the relay coil 216 is energized, it closes the relay holding switch 224 so as to maintain the relay energized upon opening of the reset switch. Manual reset for the relay circuit is necessary in order to permit removal of the conditions causing overload before the relay 208 is reenergized.

Underload and safety controls

The meter 206 and relay circuit 208 as illustrated in FIGURE 10, form part of a control component 230 with which a time delay 232 is associated as well as a breast control switch 234 and manual position controlling switches 236 and 238. The time delay relay 232 includes a relay coil 240 and a normally opened relay switch 242 which is opened in delayed response to deenergization of the relay coil 240. In the automatic position illustrated, the breast control switch 234 connects one terminal of the relay coil 240 to a common source of voltage for both automatic control assemblies 36 and 38 through conductor 246 and the overflow switch 30. The other terminal of the relay coil 240 is directly connected to a common source of voltage through the conductor 108 in the control box so that both time delay relays 104 and 232 are simultaneously energized under control of the overflow switch 30. Energization of the relay coil 106 associated with time delay relay device 104 however is completed through the relay switch 242 associated with the relay device 232 so as to place operation of each individual gin stand under control of its switches 84 and 128 to prevent ginning if conditions are unsafe. The overflow switch 30 on the other hand insures that an adequate supply of cotton is available during the ginning operation.

The relay switch 242 closed by energization of relay coil 240 is connected through the breast control switch 234 in its automatic position to conductor 110 in the control box. The relay switch 242 is also connected by its conductor 244 and the normally closed switch 238 to the relay switch 220 which is closed by the normally energized relay coil 216 to connect conductor 110 to the roll box safety switch 84 through conductor 248 in order to complete an energizing circuit for the relay coil 106 as will be explained hereafter. The relay coil energizing circuit may therefore be opened by opening the normally closed out switch 238. On the other hand, closing of the in switch 236 will connect conductor 110 to conductor 248 through relay switch 220 bypassing the time delay relay device 232 in order to energize the relay coil 106 and move the breast to the active position in order to overrule automatic operation when desired at the automatic control assembly 36 or 38.

Remote manual controls

As hereinbefore pointed out, movement of the gin breast between the active and inactive positions may be controlled for either gin stand through the remote control components 98 and 100 or both gin stands may be simultaneously controlled through the remote control component 102. Referring to FIGURE 9, it will be observed that each of the remote control components 98 and 100 are similar in arrangement and operation relative to their associated control boxes 48 and 50. Each control component includes an on-off switch 250 which is in a normally closed position connecting one terminal of a power indicator lamp 252 to the overflow switch 30 through conductor 254 also interconnecting the on-off switches of the two remote control components 98 and 100. The other terminal of the power indicator lamp 252 is connected to a power line 256 to which the conductor 108 is connected. The power line 256 is connected in parallel to the power indicator lamps in all of the remote control components. The power indicator lamps 252 are also connected to the normally closed out switches 258 in the remote control components 98 and 100, these out switches connecting the lamps through conductors 260 to the lint pressure switches 128 associated with each of the gin stands as aforementioned. Conductors 108 and 126 in the control box are also capable of being interconnected by closing of the in switch 262 in each of the remote control components 98 and 100 in order to bypass the relay switch 114 associated with the time delay relay device 104 in the control box for completing an energizing circuit for the relay coil 106 in order to move the breast to the active position for ginning purposes when desired. Alternatively, a relay energizing circuit for the relay coils 106 associated with both gin stands may be completed by closing of the in switch 264 in the remote control component 102 to which the in switches 262 are connected by conductors 266, 268, 270 and 272. It will also be noted that in each of the remote control components 98 and 100, an electrical connection is established between the conductor 254 and the conductor 260 through the on-off switch 250 and the out switch 258 in series therewith in order to complete a relay energizing circuit for the relay coil 106 when the normally opened relay switch 274 in the remote control component 102 is closed. Relay switch 274 is closed upon energization of the relay coil 276 connected across the power lines 256 and 278 in series with the normally closed out switch 280, on-off switch 282, the pressure switches 52 adjacent the condenser and the switch 54 at the press. It will be apparent therefore, that the energizing circuit established through conductor 254 may be opened to deenergize the relay coils 106 associated with both control boxes 48 and 50 upon opening of either the out switch 280, or the on-off switch 282 in the remote control component 102. Opening of the on-off switch 282 also interrupts the energizing circuit for the power indicator lamp 284 associated with the remote control component 102. It will also be apparent that operation of all of the gin stands is interrupted should any of the switch devices 52 or 54 be opened.

SUMMARY

Operation of the control system of the present invention may be summarized with reference to FIGURES 7, 8, 9 and 10. Initially, energy is supplied to the gin motors 32 and 34 through the power lines 86, 88 and 90 in order to start rotation of the ginning saws in each of the gin stands before ginning begins. Energy is also supplied to the power lines 256 and 278 at remote control component 102 and the meter relay 208 is in an energized conditioned. Raw cotton introduced into the distributor conveyor, fills each feeder until the cotton begins to flow into the overflow bin actuating the overflow switch device 30. Assuming that the relay coil 276 shown in FIGURE 9 is energized by voltage across lines 256 and 278, the relay switch 274 is closed to connect power line 278 through the overflow switch 30 and conductor 246 to the relay coil 240 in each of the automatic control assemblies 36 and 38 when the breast control switch 234 is in the automatic position illustrated in FIGURE 10. The other terminal of the relay coil 240 is connected through conductor 108 to the power line 256 in order to close the relay switch 242. Upon closing of the relay switch 242, one terminal of the relay coil 106 is connected through conductor 110, the breast control switch 234, relay switch 242, conductor 244, normally closed out switch 238, closed relay switch 220, conductor 248 and closed switches 84 and 128, conductor 260, out switch 258 in the remote control component, on-off switch 250, conductor 254 and closed relay switch 274 to power line 278. The other terminal of the relay coil 106 on the other hand is connected through conductor 108 directly to the power line 256 so as to complete an energizing circuit for the relay coil 106. Energization of the relay coil 106 immediately closes all of the normally opened relay switches associated therewith including the relay switch 116 completing an energizing circuit for the solenoid 118 to move the breast to the active position for initiating ginning operation. Closing of the relay switch 114 connects the conductor 108 to conductor 126 so that the electrical connection from the power line 256 to the relay coil 106 through relay switch 242 to conductor 110 may be bypassed in order to maintain the relay device 104 energized upon deenergization of the relay coil 240 should the overflow switch 30 open. Thus, when an adequate supply of cotton is available in the conveyor distributor, relay device 232 energizes the relay device 104 to begin the ginning operation. Thereafter, ginning operation continues under the automatic control of the meter relay 208 and the switches 84 and 128 while relay coil 240 is deenergized. Should the relay device 104 subsequently be deenergized, ginning operation will continue for a delay period during which the relay coil 240 will be reenergized by the overflow switch 30 if the supply of raw cotton persists so that recycling occurs until the feed rate is adjusted either automatically or manually. It should be appreciated in this regard that each time the relay device 104 is deenergized, feeding through the feeder stops if the switch 146 and the mode selector 160 are in the automatic positions. On the other hand, if the ginning rate increases because of an inadequate supply of cotton or a reduction in its quality, the relay device 104 will be deenergized and relay coil 240 will not cause recycling during the delay period. The ginning operation will therefore stop upon opening of the time delay switch 116. Also, since feeding of cotton into the gin stand stops before ginning is interrupted, all of the cotton in the feeder is ginned out of the gin stand to prevent contamination of the next batch of cotton by poor quality cotton that would otherwise be exposed on one side of the next bale of cotton pressed.

Upon energization of the relay device 104, the relay switch 112 is immediately closed so as to connect the power line 120 through conductor 124 to the feed control circuit as hereinbefore described in connection with FIGURE 8. Thus, feeding operation begins simultaneously with movement of the breast to the ginning position. Further, since the feed control circuit as well as the solenoid 118 for the breast positioning cylinder device 58 are both energized from the same power supply lines to the gin motor, any loss of power to the gin motor will simultaneously interrupt operation of the feeder to prevent any choke developing in the machine.

The feed control when operated in its automatic mode will vary the feed rate of the feeder in proportion to changes in the load imposed on the gin motor so that an increase in the ginning rate will produce a corresponding increase in the feed rate thereby enabling the gin to operate at its maximum capacity. Further, even though the variation in feed rate follows the variation in load on the gin motor, the feed rate is prevented from approaching zero when ginning begins under a low load by means of the travel limit switch 162 stopping the control motor 132 at a position corresponding to 40% of the maximum feed rate. Thus, a minimum amount of cotton will be fed into the gin stand as soon as feeding begins. The feed rate will then increase as aforementioned in accordance with increases in the saw load on the gin motor up to an adjusted reference feed rate set by the low set point control potentiometer 152. This feed rate is selected by the operator through the potentiometer control 152 on the control panel 286 associated with each automatic control assembly as shown in FIGURE 4. For adjustment purposes, the knob associated with the control 152 is set to 100 while the feed control circuit is set for automatic operation through the mode selector 160 and the saw load observed on the meter 206. The sensitivity adjusting potentiometer 188 as shown in FIGURE 8 may then be adjusted until the saw load meter indicates a desired value corresponding to a maximum feed rate position. The potentiometer control 152 may then be moved to lower feed rate positions to which the feed control circuit will be held in the manual mode of operation. This feed rate position of the control 152 will also establish a reference feed rate above which the feeder cannot be automatically adjusted during the automatic mode of operation. Therefore, should a condition arise wherein the saw load imposed on the gin motor cannot be accommodated by the feed control circuit in its adjusted automatic mode of operation, the saw load uncontrolled by a corresponding increase in feed rate would become excessive. When this occurs, the relay coil 216 in the relay circuit 208 is deenergized illuminating the reset push button 228 through the indicator lamp 226 and at the same time interrupting the energizing circuit for the breast control relay device 104 moving the breast portion of the gin stand to the inactive position after a short delay following immediate interruption of the feeding operation through the feeder. The cause of the overload condition must then be removed before the meter circuit 208 is reset and toward this end, the control exercised over the breast positioning device by the meter circuit 208 may be bypassed by positioning the breast control switch device 234 to the manual position. The breast portion of the gin stand may then be moved to either the active or inactive position through the in and out positioning switches 236 and 238 located on the control panel 286 adjacent to the gin stand as shown in FIGURE 4. The feeding of cotton through the feeder may also be effected independent of the ginning operation by movement of the feed motor control switch 146 to the manual position in which case, the feed rate may be monitored through the meter 156.

Ginning operation may be interrupted or begun at any time under selective manual control through the remote control components 98, 100 and 102 as aforementioned if conditions are safe. These remote control components also provide the desired degree of flexibility in that either one or both of the gin stands may be so controlled. Manual control over the individual gin stands may also be exercised at the control panels of the control assemblies when the breast control switch 234 is in the manual position. With the feed motor control switch 146 in the off position, no feeding will occur regardless of the position of the gin breast. With the feed motor control switch 146 in the manual position, cotton may be run out of the gin stand with the gin breast in the inactive position in the event of fire for example.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a plurality of cotton gins to which raw cotton is supplied by a common distributor conveyor and from which ginned cotton is removed by a common lint flue, each of said cotton gins including a ginning saw, a breast displaceable between inactive and active positions relative to the ginning saw, a feeder delivering raw cotton from the distributor conveyor into a seed roll chamber into which the ginning saw extends in the active position of the breast and a gin motor drivingly connected to the ginning saw having electrical power lines connected to a source of electrical energy, wherein the improvement comprises a control system connected to said cotton gins for individually regulating the supply of raw cotton thereto in accordance with the ability of each cotton gin to separate lint at a ginning rate predetermined by the quality of the raw cotton, said control system including feed control means for rendering the feeder operative at a regulated feed rate simultaneously with operation of the ginning saw by the gin motor of an associated cotton gin, current responsive means operatively coupled with the power lines of said gin motor for sensing changes in the current flow through the motor in response to the load imposed thereon by the ginning saw, breast positioning means connected to the current responsive means for effecting displacement of the breast from one of said positions thereof to the other in delayed response to excessive changes in the load imposed on the gin motor, and means for instantaneously disabling operation of the feeder in response to said excessive changes in load, means responsive to an adequate supply of raw cotton in the distributor conveyor for rendering the breast positioning means simultaneously operative in all of the cotton gins to effect displacement of the breast to the active positions, and means for holding the breasts in said active positions after said feeders are loaded with raw cotton.

2. The combination of claim 1 including remote control means connected to the breast positioning means for selectively displacing the breasts between said positions thereof in either individual cotton gins or in all of the cotton gins simultaneously.

3. The combination of claim 2 wherein said current responsive means comprises current monitoring means for measuring current in said power lines, condition altering means connected to said current monitoring means for simultaneously indicating overload of the gin motor and operating said disabling means and means connecting said current monitoring means to the feed control means for varying the feed rate of the feeder in accordance with changes in the current measured in said power lines.

4. The combination of claim 3 wherein said current monitoring means includes a pair of current signal coils, a meter connected to one of said signal coils, the other signal coil being connected to the feed control means, and a power transformer inductively coupling said power lines to the condition altering means and the feeder.

5. The combination of claim 4 wherein said feed control includes, a reversible control motor for changing the feed rate, proportioning relay means operatively connected to said current monitoring means for energizing the control motor in response to a change in current in the power lines from a reference value, variable load means connected to said control motor and the proportioning relay means for establishing said reference value, limit switch means connected to the control motor for limiting the feed rate of the feeder to a minimum value, over-speed preventing means connected to the proportioning relay means and the control motor for restoring the feed rate to said minimum value through the control motor, mode selector means selectively disconnecting the control motor from the limit switch means and the over-speed preventing means, and manual feed rate changing means for reversibly connecting the load means across the control motor when disconnected by the mode selector means for selectively energizing the control motor.

6. The combination of claim 5 wherein said variable load means includes a manually adjusted set point resistor, a speed signal resistor varied by the control motor in series with the set point resistor, and a voltmeter indicator connected across the speed signal resistor to indicate percentage of maximum feed rate of the feeder.

7. In combination with a plurality of cotton gins to which raw cotton is supplied by a common distributor conveyor and from which ginned cotton is removed by a common lint flue, each of said cotton gins including a ginning saw, a breast displaceable between inactive and active positions relative to the ginning saw, a feeder delivering raw cotton from the distributor conveyor into a seed roll chamber into which the ginning saw extends in the active position of the breast and a gin motor drivingly connected to the ginning saw having electrical power lines connected to a source of electrical energy, wherein the improvement comprises a control system connected to said cotton gins for individually regulating the supply of raw cotton thereto in accordance with the ability of each cotton gin to separate lint at a ginning rate predetermined by the quality of the raw cotton, said control system including feed control means for rendering the feeder operative at a regulated feed rate simultaneously with operation of the ginning saw by the gin motor of an associated cotton gin, current responsive means operatively coupled with the power lines of said gin motor for sensing changes in the current flow through the motor in response to the load imposed thereon by the ginning saw, breast positioning means connected to the current responsive means for effecting displacement of the breast from one of said positions thereof to the other in delayed response to excessive changes in the load imposed on the gin motor, and means for instantaneously disabling operation of the feeder in response to said excessive changes in load, and protective switch means connected to said breast positioning means for effecting displacement of the breast to the inactive position upon opening of the seed roll chamber.

8. The combination of claim 7 including remote control means connected to the breast positioning means for selectively displacing the breasts between said positions thereof in either individual cotton gins or in all of the cotton gins simultaneously.

9. In combination with a cotton gin having a ginning saw, a breast displaceable between inactive and active positions relative to the ginning saw, a feeder delivering raw cotton into a seed roll chamber into which the ginning saw extends in the active position of the breast and a gin motor drivingly connected to the ginning saw having electrical power lines connected to a source of electrical energy, wherein the improvement comprises a control system connected to the cotton gin for regulating the supply of raw cotton thereto in accordance with the ability of the cotton gin to separate lint at a ginning rate predetermined by the quality of the raw cotton, said control system including feed control means for rendering the feeder operative at a regulated feed rate simultaneously with operation of the ginning saw by the gin motor, current responsive means operatively coupled with the power lines of said gin motor for sensing changes in the current flow through the motor in response to the load imposed thereon by the ginning saw, breast positioning means connected to the current responsive means for effecting displacement of the breast from one of said positions thereof to the other in delayed response to excessive changes in the load imposed on the gin motor, and means for instantaneously disabling operation of the feeder in response to said excessive changes in load, said current responsive means comprising, current monitoring means for measuring current in said power lines, condition alerting means connected to said current monitoring means for simultaneously indicating overload of the gin motor and operating said disabling means and means connecting said current monitoring means to the feed control means for varying the feed rate of the feeder in accordance with changes in the current measured in said power lines.

10. The combination of claim 9 wherein said current monitoring means includes a pair of current signal coils, a meter connected to one of said signal coils, the other signal coil being connected to the feed control means, and a power transformer inductively coupling said power lines to the condition alerting means and the feeder.

11. The combination of claim 10 wherein said feed control includes, a reversible control motor for changing the feed rate, proportioning relay means operatively connected to said current monitoring means for energizing the control motor in response to a change in current in the power lines from a reference value, variable load means connected to said control motor and the proportioning relay means for establishing said reference value, limit switch means connected to the control motor for limiting the feed rate of the feeder to a minimum value, over-speed preventing means connected to the proportioning relay means and the control motor for restoring the feed rate to said minimum value through the control motor, mode selector means selectively disconnecting the control motor from the limit switch means and the over-speed preventing means, and manual feed rate changing means for reversibly connecting the load means across the control motor when disconnected by the mode selector means for selectively energizing the control motor.

12. The combination of claim 11 wherein said variable load means includes a manually adjusted set point resistor, a speed signal resistor varied by the control motor in series with the set point resistor, and a voltmeter indicator connected across the speed signal resistor to indicate percentage of maximum feed rate of the feeder.

13. In combination with a cotton gin having a ginning saw, a breast displaceable between inactive and active positions relative to the ginning saw, a feeder delivering raw cotton into a seed roll chamber into which the ginning saw extends in the active position of the breast and a gin motor drivingly connected to the ginning saw having electrical power lines connected to a source of electrical energy, wherein the improvement comprises a control system connected to the cotton gin for regulating the supply of raw cotton thereto in accordance with the ability of the cotton gin to separate lint at a ginning rate predetermined by the quality of the raw cotton, said control system including feed control means for rendering the feeder operative at a regulated feed rate simultaneously with operation of the ginning saw by the gin motor, current responsive means operatively coupled with the power lines of said gin motor for sensing changes in the current flow through the motor in response to the load imposed thereon by the ginning saw, breast positioning means connected to the current responsive means for effecting displacement of the breast from one of said positions thereof to the other in delayed response to excessive changes in the load imposed on the gin motor, and means for instantaneously disabling operation of the feeder in response to said excessive changes in load, said feed control including, a reversible control motor for changing the feed rate, proportioning relay means operatively connected to said current responsive means for energizing the control motor in response to a change in current in the power lines from a reference value, variable load means connected to said control motor and the proportioning relay means for establishing said reference value, limit switch means connected to the control motor for limiting the feed rate of the feeder to a minimum value, over-speed preventing means connected to the proportioning relay means and the control motor for restoring the feed rate to said minimum value through the control motor, mode selector means selectively disconnecting the control motor from the limit switch means and the over-speed preventing means, and manual feed rate changing means for reversibly connecting the load means across the control motor when disconnected by the mode selector means for selectively energizing the control motor.

14. The combination of claim 13 wherein said variable load means includes a manually adjusted set point resistor, a speed signal resistor varied by the control motor in series with the set point resistor, and a voltmeter indicator connected across the speed signal resistor to indicate percentage of maximum feed rate of the feeder.

15. In combination with a cotton gin having a ginning saw, a breast displaceable between inactive and active positions relative to the ginning saw, a feeder delivering raw cotton into a seed roll chamber into which the ginning saw extends in the active position of the breast and a gin motor drivingly connected to the ginning saw having electrical power lines connected to a source of electrical energy, wherein the improvement comprises a control system connected to the cotton gin for regulating the supply of raw cotton thereto in accordance with the ability of the cotton gin to separate lint at a ginning rate predetermined by the quality of the raw cotton, said control system including feed control means for rendering the feeder operative at a regulated feed rate simultaneously with operation of the ginning saw by the gin motor, current responsive means operatively coupled with the power lines of said gin motor for sensing changes in the current flow through the motor in response to the load imposed thereon by the ginning saw, breast positioning means connected to the current responsive means for effecting displacement of the breast from one of said positions thereof to the other in delayed response to excessive changes in the load imposed on the gin motor, and means for instantaneously disabling operation of the feeder in response to said excessive changes in load, protective switch means connected to said breast positioning means for effecting displacement of the breast to the inactive position upon opening of the seed roll chamber.

16. In combination with a cotton gin having a ginning saw driven by a gin motor, a feeder delivering raw cotton to the ginning saw and a source of electrical energy connected to the motor for energizing the same, current responsive means connected to the gin motor for sensing changes in current supplied thereto from the source in response to the load imposed on the motor by the ginning saw, and means for instantaneously disabling operation of the feeder in response to excessive changes in load, said current responsive means including current monitoring means for measuring current supplied to the motor, alerting indicator means connected to the current monitoring means for simultaneously indicating overload of the gin motor and operation of said disabling means, and feed rate control means connected to the current monitoring means for varying the feed rate of the feeder in accordance with changes in the current measured by the current monitoring means.

References Cited

UNITED STATES PATENTS

| | | | |
|---|---|---|---|
| 2,655,695 | 10/1953 | Ford | 19—55 |
| 2,761,178 | 9/1956 | Van Doorn et al. | 19—55 XR |
| 3,160,922 | 12/1964 | Neitzel et al. | 19—55 |
| 3,177,529 | 4/1965 | Neitzel et al. | 19—64.5 |
| 1,259,034 | 3/1918 | Milam | 19—39 |
| 1,424,021 | 7/1922 | Hubbard | 19—48 |

DORSEY NEWTON, Primary Examiner

U.S. Cl. X.R.

19—55